Aug. 14, 1956 N. A. GRAY ET AL 2,758,370

SHEARING HEAD SECURING MEANS FOR ELECTRIC SHAVER

Filed Jan. 25, 1954

4 Sheets-Sheet 1

INVENTORS
NORMAN A. GRAY
LAWRENCE R. CEDERBAUM
BY
Burgess Ryan & Hicks
ATTORNEYS

SHEARING HEAD SECURING MEANS FOR ELECTRIC SHAVER

Filed Jan. 25, 1954

4 Sheets-Sheet 2

INVENTORS
NORMAN A. GRAY
LAWRENCE R. CEDERBAUM
BY
Burgess Ryan & Hicks
ATTORNEYS Aug. 14, 1956 N. A. GRAY ET AL 2,758,370

SHEARING HEAD SECURING MEANS FOR ELECTRIC SHAVER

Filed Jan. 25, 1954

4 Sheets-Sheet 3

INVENTORS
NORMAN A. GRAY
LAWRENCE R. CEDERBAUM
BY
Burgess Ryan & Hicks
ATTORNEYS

SHEARING HEAD SECURING MEANS FOR ELECTRIC SHAVER

Filed Jan. 25, 1954 4 Sheets-Sheet 4

INVENTORS
NORMAN A. GRAY
LAWRENCE R. CEDERBAUM
BY
Burgess Ryan & Hicks
ATTORNEYS

United States Patent Office 2,758,370

Patented Aug. 14, 1956

2,758,370

SHEARING HEAD SECURING MEANS FOR ELECTRIC SHAVER

Norman A. Gray, Stamford, Conn., and Lawrence R. Cederbaum, Haddonfield, N. J., assignors to Schick Incorporated, Stamford, Conn., a corporation of Delaware Application January 25, 1954, Serial No. 405,783

12 Claims. (Cl. 30—43)

This invention has to do with electric shavers of the kind in which a shearing head unit, consisting of one or more pairs of outer and inner, relatively movable cutters, is removably secured to the case which houses the electric drive motor.

Heretofore, the common practice has been to mount the shearing head unit so that its underside abuts an end surface of the shaver case between locating case jaws, at least one of the jaws having a threaded opening to receive a thumb screw which, when tightened, engages one side of the head unit and clamps it to the case.

The object of the invention is to eliminate the thumb screw and provide improved, vibration-proof means for securing the head unit to the case.

As described below in greater detail, the present invention provides a concealed form of locking means associated with the case and arranged to be operated to interlock with a lower portion (preferably the underside) of the head unit, the latter being provided with shoulders formed by slots or recesses and herein referred to generally as suitable lug means, for engagement by latch means forming part of the locking means. The locking means includes an exteriorly accessible operating member, preferably consisting of a lever or arm projecting from the case at a point where it, too, can be concealed, as by one or another of the known forms of beard clippings receptacles commonly used to catch the hair clippings emerging from the ends of the shearing head unit.

Figure 1:
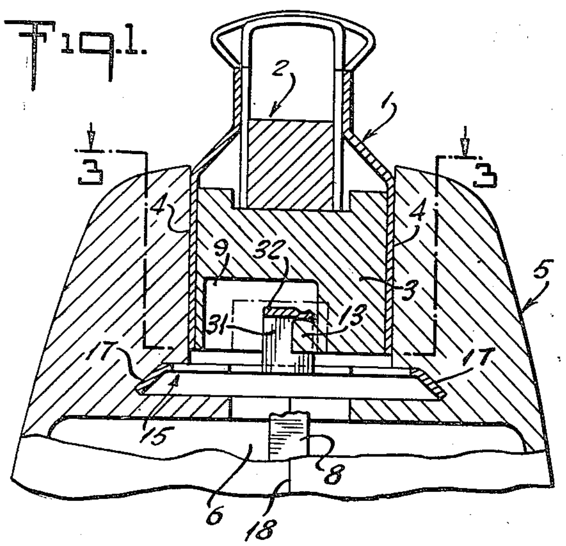
Fig. 1 is a vertical section of the upper end of an electric shaver incorporating one form of the invention, the section being taken transversely of the head unit and on the line 1—1 of Fig. 3.
Figure 6:
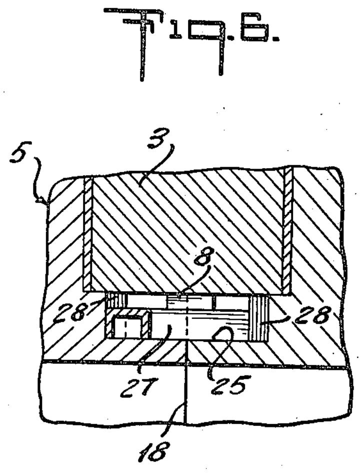
Fig. 6 is a section on the line 6—6 of Fig. 3.
Figure 2:
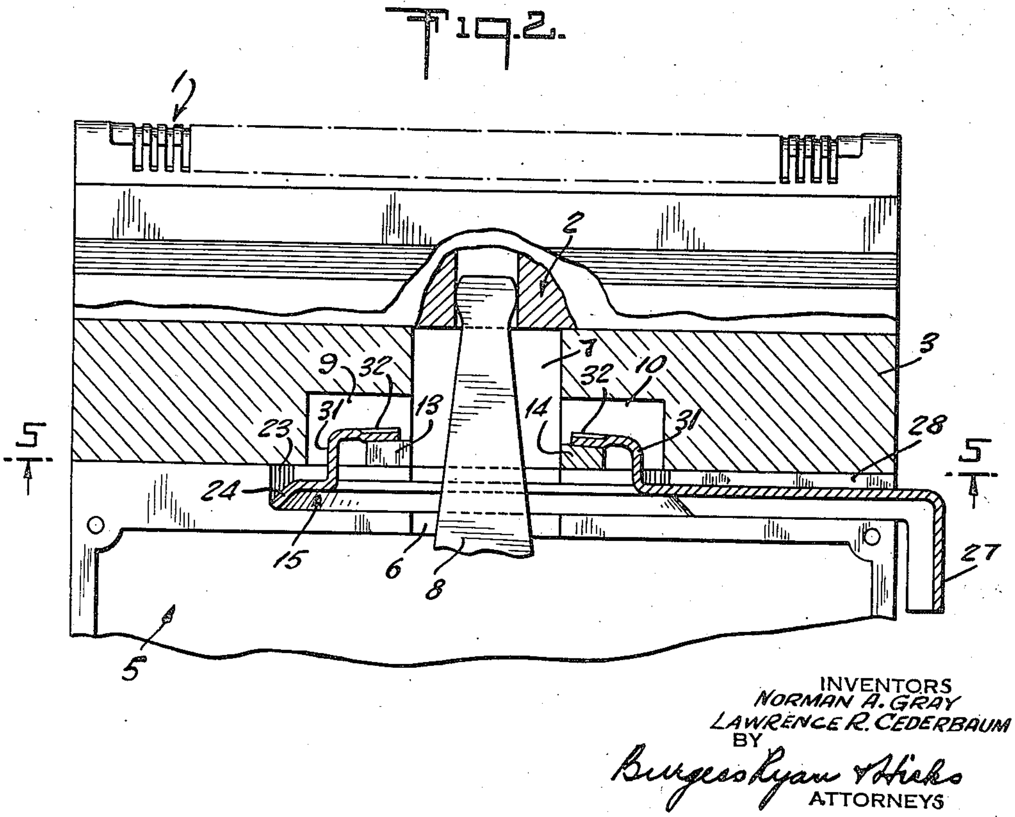
Fig. 2 is a view of the upper end of the shaver in partial vertical section, the section being taken longitudinally of the head unit and on the line 2—2 of Fig. 3.

In the form of the invention illustrated in Figs. 1–6, the shearing head unit is shown as consisting of a single pair of outer and inner cutters, marked 1 and 2, respectively. The outer cutter will be recognized as of the type including a shell of more or less inverted U-shape, suitably apertured or slotted on top, secured to and upstanding from a base or block 3. The head unit is located in the jaws 4 of a motor case 5, the latter and the base block being apertured as usual, as at 6, 7, to receive the inner cutter actuator 8 (Fig. 2). This general arrangement is well known and needs no further description.

In general, the locking means of the invention is located more or less between the case jaws and beneath the shearing head unit, that is, in the sense that, except for its projecting operating arm, the locking means is concealed by the head unit when the latter is in place, the locking means also being positioned to interlock with a wall portion or the like of such unit from beneath, within or adjacent a lower portion of the unit.

The locking means of the invention of this first form is arranged to engage a portion of the underside of the base block 3 between the case jaws and, to that end, the block is recessed, as at 9, 10, these recesses being in the nature of lateral extensions of the central aperture 7. The side walls 11 and 12 of recesses 9 and 10 (Fig. 5) are provided with oppositely facing projections 13, 14, the top surfaces of which are preferably sloped outwardly or away from the center of the head unit (Fig. 2) and also in a transverse direction (Fig. 1). These projections constitute the lug means adapted to be engaged by the locking means now to be described.

The locking means includes an element associated with the case and arranged for limited flexing or movement relatively to it and, preferably, in a plane parallel to that of the base of the shearing head unit. For purposes of illustration, this element is shown as consisting of a single piece 15, such as a sheet metal stamping, of annular form with oppositely disposed arcuate flange portions 16 (Figs. 3, 4) designed to seat and rotate in undercut track grooves 17 (Fig. 1) formed in the case below the head unit. As will be understood, the case may consist of two similar halves mating on the center line 18, with the track grooves formed in the respective case halves. The assembly of the case halves, with the element 15 in position, thus serves to conceal the element and lock it against removal, while leaving it free to rotate.

The underside of the head unit, that is, of the base block 3 in this form, abuts and seats at one end on the end surfaces 19, 20 of the case halves and, at its other end, on the triangular surfaces 21, 22 (Figs. 3, 4) the area between these various seat surfaces being depressed. The resulting recess 23 serves to accommodate the end portion 24 of the locking element 15 and the recess 25 to accommodate the end portion 26 together with the lever or operating member 27 which, as shown, is an integral part of the element 15 and projects beyond the case so as to be accessible for manual manipulation. The walls 28 will be recognized as serving to limit the movement of the operating lever, its limit positions being indicated in Figs. 3 and 4, respectively. As indicated, the recesses 23, 25 have undercut extensions 29, 30 to accommodate the corners of the end portions of locking element 15 in its Fig. 4 limit position.

The locking element, operated by lever 27, is arranged to actuate latch means engageable with and disengageable from the head unit lugs. The latch means may comprise an integral part of element 15, being shown as consisting of a pair of upstanding arms 31 having inwardly directed, resilient latch portions 32.

Figures 3, 4, 5:
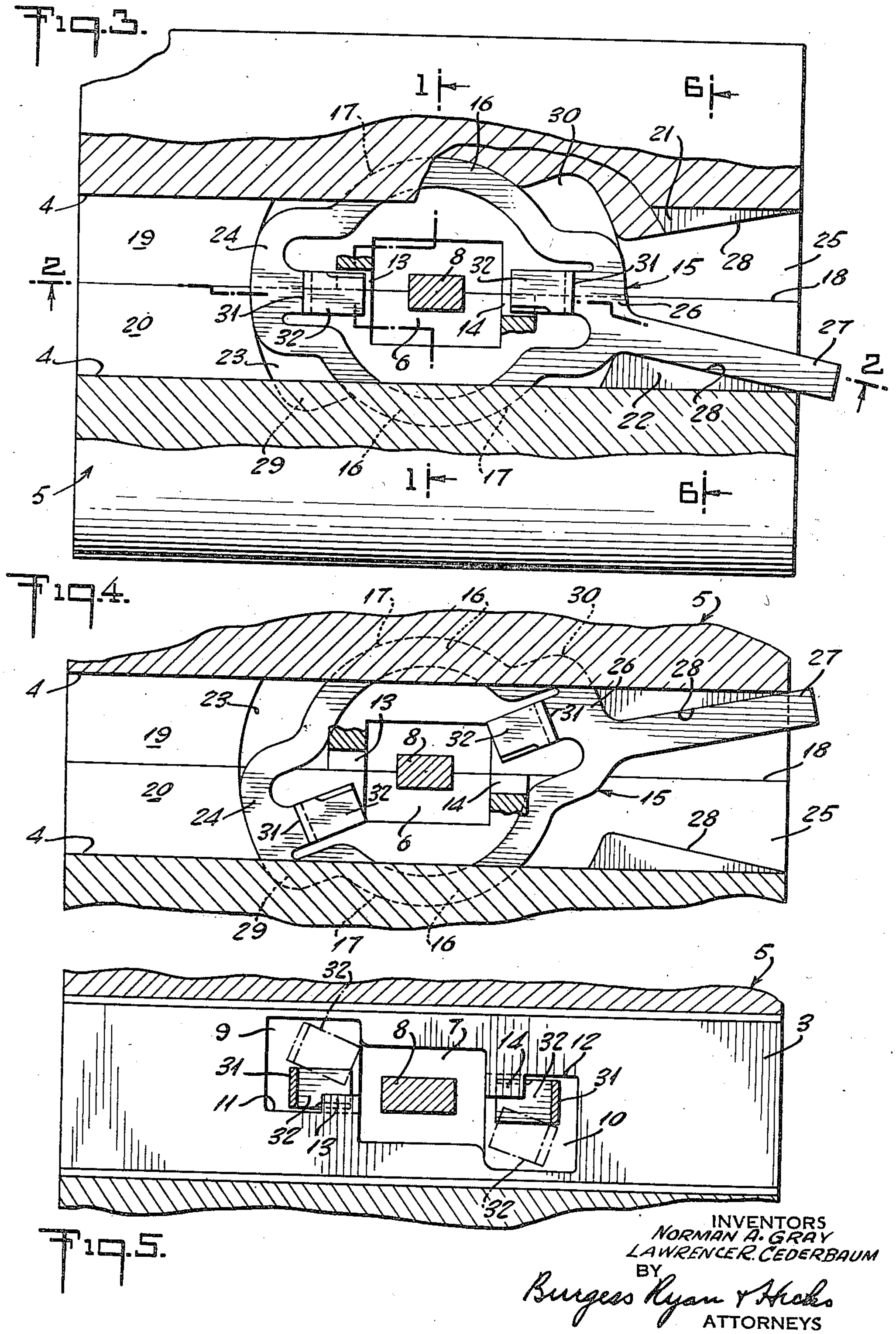
Fig. 3 is a broken out horizontal section on the line 3—3 of Fig. 1.
Fig. 4 is a top plan view corresponding to Fig. 3 but with the rotatable element in its off or disengaged positions.
Fig. 5 is an inverted view as on the line 5—5 of Fig. 2.

As will be seen, the head unit is freely insertable and removable when the locking means occupies the Fig. 4 position but when, with the head unit in place, the operating member is swung to its other position, as shown in Fig. 3, the element 15 is rotated to engage the latch means with the lug means and thereby lock the head unit to the case. By appropriately sloping the top surfaces of the lug elements, as mentioned above, and setting the latch portions so that they are required to be sprung slightly in moving into their locking position, the head unit is held securely and the element 15 itself held in its locking position. Due to the annular form of element 15, ample clearance is provided for the passage and movement of the inner cutter actuator 8 during operation of the shaver.

In the form illustrated in Figs. 7–10, the invention is shown applied to a different type of shearing head unit. In this instance, the unit consists of two pairs of outer and inner cutters, generally designated 40 and 41, separated by a spacer member 42. In accordance with common practice, the two outer cutters may be and preferably are secured to the spacer member to form a unit adapted to be mounted in the end of the shaver case between the case jaws 43, 44.

In this form of the invention, the lug means are formed as an integral part of the spacer member and more particularly of a portion of it which projects below the bottoms of the outer cutters. As illustrated, the downwardly projecting portion of the spacer member includes a post or central portion 45 incorporating extensions 46, 47, the top surfaces of which are sloped in opposite directions from more or less central ridges 46′, 47′, the ridges themselves also sloping downwardly toward the free ends of the extensions 46, 47.

As in the form previously described, the locking means includes an annular element 48 mounted for limited rotation in undercut tracks or grooves 49, 50 formed in the two case halves, this element being provided with a radially projecting operating member or lever 51. The latch means comprises two radially inwardly directed portions 52, 53 at least the inner ends 54, 55 of which are creased and bent to conform substantially to the shape of the top surfaces of the lug etxensions 46, 47.

Figures 7, 8, 9, 10:
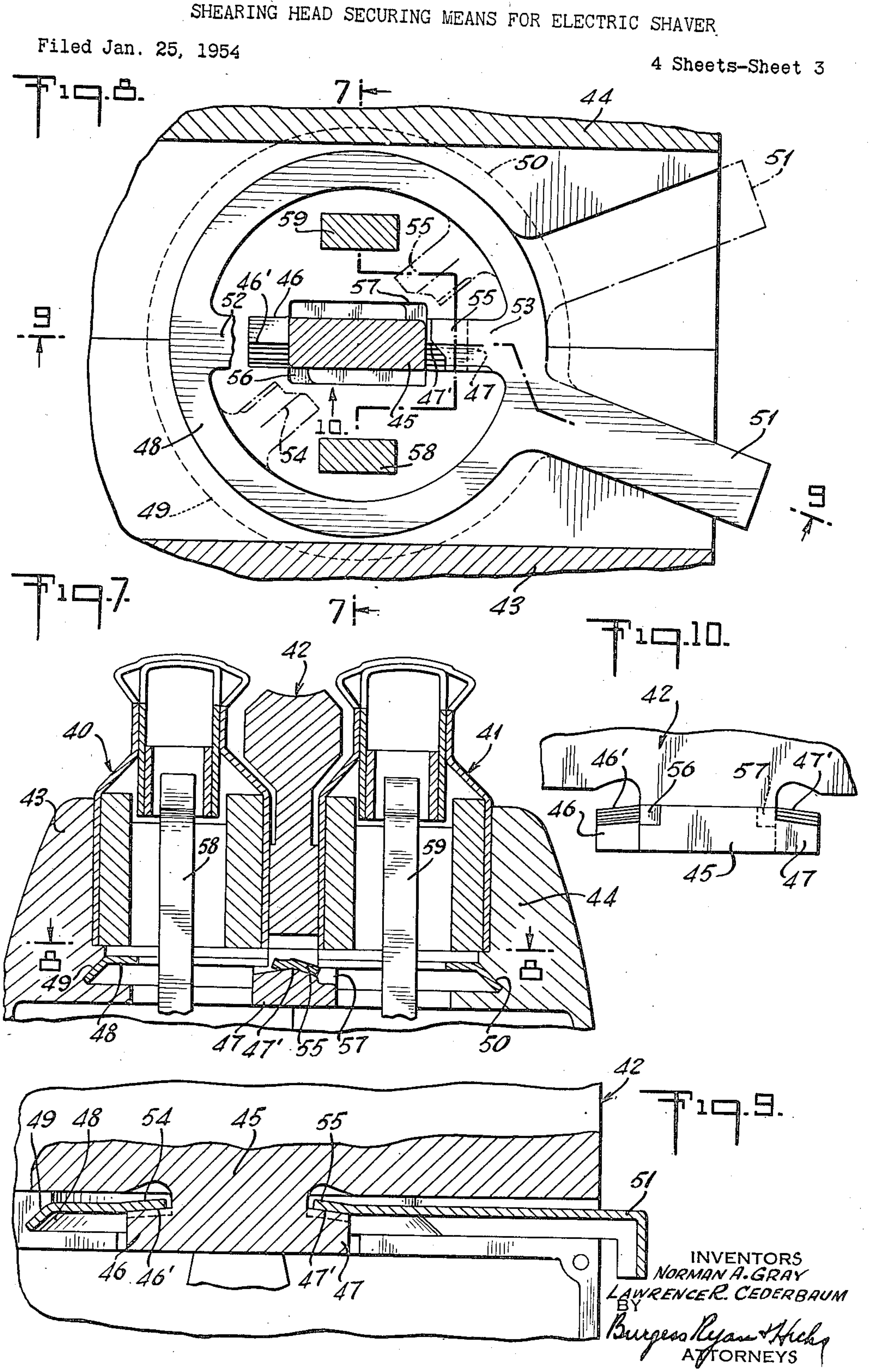
Fig. 7 is a vertical section on the upper end of a so-called double headed electric shaver incorporating another form of the invention, the section being taken transversely of the head unit and on the line 7—7 of Fig. 8.
Fig. 8 is a horizontal section on the line 8—8 of Fig. 7.
Fig. 9 is a vertical section on the line 9—9 of Fig. 8.
Fig. 10 is a broken out elevational view of a detail viewed in the direction of the arrow 10 of Fig. 8.

As before, the locking and unlocking of the head unit is accomplished by simply moving the lever 51 between its full and broken line portions indicated in Fig. 8, thereby effecting the engagement of the latch means with and their disengagement from the lug means formed on the projecting portion of the spacer member.

As indicated in the drawings, the opposite corners of the portion 45 of the spacer member are cut away at 56, 57 to provide adequate clearance for movement of the latch means; and as will be recognized, the form of the latch means and lug surfaces is such as to form a snap-action interlock which serves to hold the latch means engaged with the lugs until forcibly disengaged by movement of lever 51.

As in the previous construction, the annular form of element 48 provides ample clearance for the passage and operation of the two inner cutter actuators 58 and 59.

Figure 12:
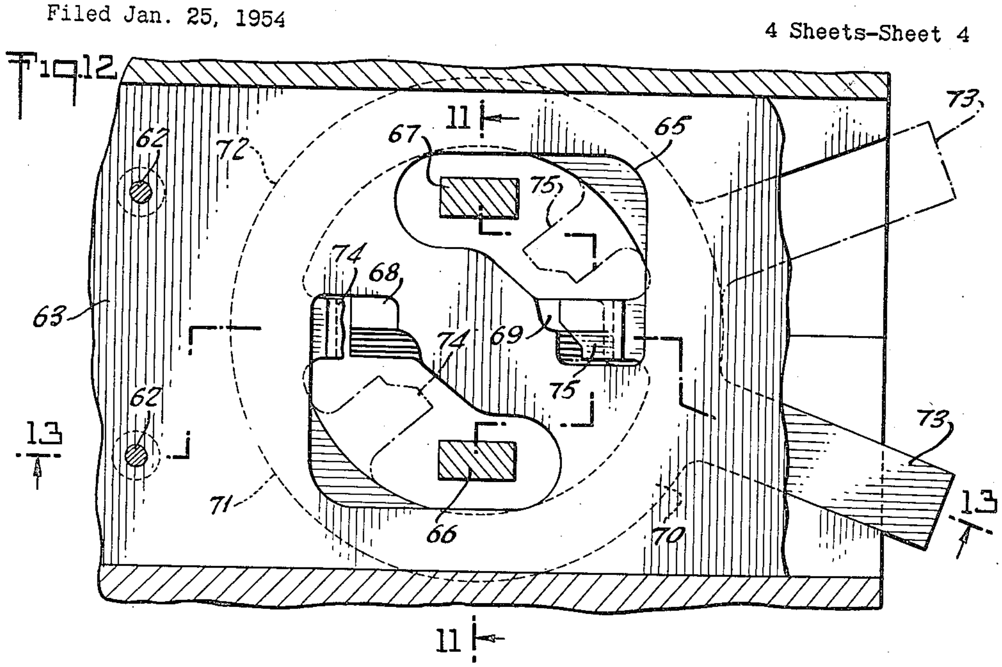
Fig. 12 is a horizontal section on the line 12—12 of Fig. 11.
Figure 11:
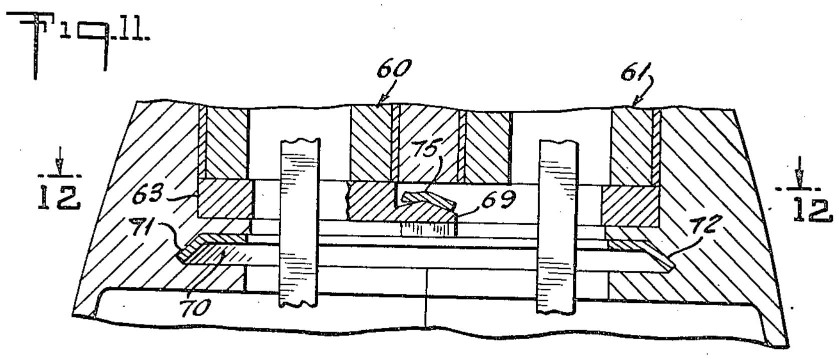
Fig. 11 is a broken out vertical section showing still another form of the invention, the section being taken on the line 11—11 of Fig. 12.
Figure 13:
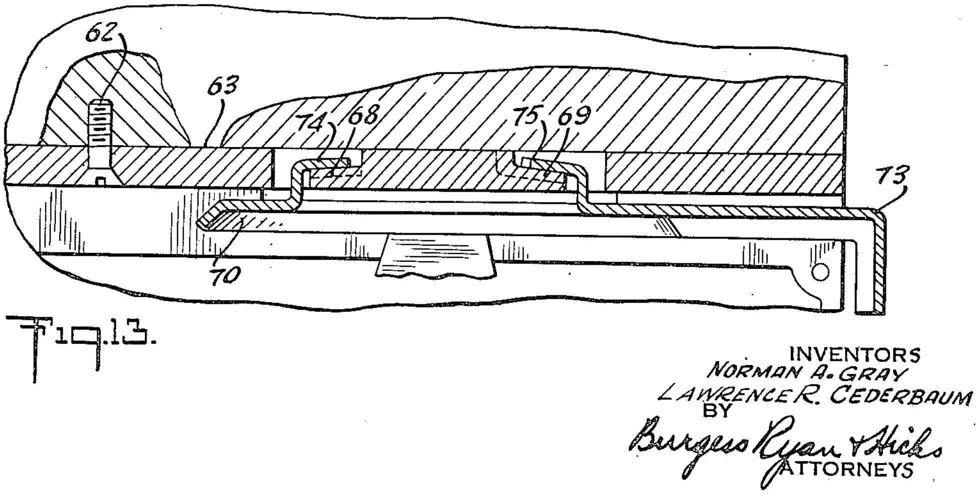
Fig. 13 is a broken out vertical section on the line 13—13 of Fig. 12.

In the form illustrated in Figs. 11–13, the invention is shown applied to still another type of shearing head unit. In this construction, the two outer cutters indicated at 60, 61, are secured, as by screws 62, to a base plate 63 and the lug means are formed as part of this base plate.

As shown in Fig. 12, the base plate is provided with two similar openings 64, 65 of a size and so located so as to accommodate the inner cutter actuators 66, 67. In one corner of each of these openings, the plate incorporates projections 68, 69 of less thickness than the plate and having their upper surfaces sloped as previously described with reference to the extensions 46, 47.

The locking means will be recognized as generally similar to those already described, including the annular element 70 rotatably mounted in undercut tracks 71, 72 in the case halves, the operating lever 73 and the upstanding and overhanging latch elements 74, 75, engageable with and disengageable from the lug means 68, 69 of the base plate in response to manipulation of the operating lever.

It may be noted, particularly in connection with this form of the invention, that the case jaws, while having esthetic value in that they more or less streamline the head end of the case, are not essential for the heretofore usual purpose of, respectively, receiving a head clamping screw and backing up and forming a clamping abutment for the side of the head remote from the screw.

It will be understood that the invention is by no means limited in its application to the three types of shearing head unit shown herein; also that the unitary form of locking means, while having definite advantages from the standpoint of simplicity, is merely illustrative.

In the light of the foregoing exemplifications of the principles of the invention, the following is claimed:

1. In an electric shaver of the kind including a case incorporating jaws and a shearing head unit located in the jaws, the improvement which comprises: lug means associated with the underside of the head unit between the jaws; arcuate track means formed in the case beneath the head unit; a rotatable element located in the track means; latch means adapted for operation by the rotatable element to engage with and disengage from the said lug means; and manual means for rotating the said element.

2. In an electric shaver of the kind including a case incorporating jaws and, located therein, a shearing head unit consisting of a pair of shearing heads having a spacer member therebetween, the improvement which comprises: lug means depending from the spacer member below the bases of the shearing heads; and head unit locking means associated with the case and movable into and out of engagement with the said lug means.

3. In an electric shaver of the kind including a case incorporating jaws and, located therein, a shearing head unit consisting of a pair of shearing heads having a spacer member therebetween, the improvement which comprises: lug means depending from the spacer member below the bases of the shearing heads; and head unit locking means associated with the case including an element associated with the case and mounted for rotation relatively to it in a plane parallel to that of the bottoms of the said shearing heads.

4. In an electric shaver of the kind including a case incorporating jaws and a shearing head unit located in the jaws, the improvement which comprises: lug means associated with the underside of the head unit between the jaws; arcuate track means formed in the case beneath the head unit; a rotatable element located in the track means; latch means upstanding from the said element and located for movement, upon rotation of the element, into and out of engagement with the said lug means.

5. In an electric shaver of the kind including a case comprising mated case halves incorporating jaws and a shearing head unit located in the jaws, the improvement which comprises: head unit locking means associated with the case and adapted for engagement with a central portion of the underside of the head unit between the jaws, the locking means including a rotatable element and a single exteriorly accessible operating member therefor movable between two at-rest positions in one of which the head unit is interlocked with and in the other of which the head unit is released for removal from the case, the case halves having recesses together forming a cavity to house the said rotatable element.

6. In an electric shaver of the kind including a case comprising mated case halves incorporating jaws and a shearing head unit located in the jaws, the improvement which comprises: head unit locking means adapted for engagement with a portion of the underside of the head unit between the jaws and including an element rotatable relatively to the case beneath the head unit in a plane parallel to the base of the head unit, and means accessible from outside the case for operating said rotatable element to interlock the head unit with and release it from the case, the case halves having recesses together forming a cavity to house the said rotatable element.

7. In an electric shaver of the kind including a case comprising mated case halves incorporating jaws and a shearing head unit located in the jaws, the improvement which comprises: lug means associated with the underside of the head unit between the jaws; latch means movable into and out of engagement with the lug means; an element seated in the case beneath the head unit and rotatable relatively to the case in a plane parallel to the base of the head unit to actuate the latch means; and exteriorly accessible means for operating the rotatable element, the case halves having recesses together forming a cavity to house the said rotatable element.

8. In an electric shaver of the kind including a case comprising mated case halves incorporating jaws and a shearing head unit located in the jaws, the improvement which comprises: head unit locking means associated with the case and adapted for engagement with a portion of the underside of the head unit between the jaws, the locking means including an operating member movable back and forth between the jaws and protruding therefrom at one end thereof beneath the head unit, the case halves having recesses together accommodating the operating member.

9. In an electric shaver of the kind including a case comprising mated case halves incorporating jaws and a shearing head unit located in the jaws, the improvement which comprises: head unit locking means adapted for engagement with a portion of the underside of the head unit between the jaws and including an element rotatable relatively to the case beneath the head unit in a plane parallel to that of the base of the unit, and lever means for operating said element protruding between the jaws at one end thereof beneath the head unit, the case halves having recesses together forming a cavity to house the said rotatable element.

10. In an electric shaver of the kind including a case comprising mated case halves, a mounting plate abutting an end surface thereof and a shearing head unit secured to said plate, the improvement which comprises: lug means associated with the said plate; and plate locking means movable into and out of engagement with the said lug means, the said shearing head unit and plate being bodily removable when the said locking means is out of engagement with the said lug means, the case halves having recesses together forming a track to guide the plate locking means.

11. In an electric shaver of the kind including a case comprising mating case halves incorporating jaws, a shearing head unit located in the jaws and a cutter actuating lever upstanding between the jaws, the improvement which comprises: a pair of lugs associated with the underside of the head unit and spaced from and disposed one on each side of the longitudinal center of the unit; a locking element mounted beneath the unit for rotation about said center in a plane parallel to that of the base of the head unit and having latch portions movable, upon rotation of the element, into and out of engagement with the said lugs, said locking element being of annular form encircling and spaced from the actuating lever to accommodate oscillating movement thereof, and said case halves having recesses together forming a track to guide the locking element.

12. In an electric shaver of the kind including a case comprising mating case halves incorporating jaws and a shearing head unit located in the jaws, the improvement which comprises; a lever arm projecting below the head unit and jaws at one end thereof and manually movable laterally of the said unit and jaws; lug means associated with the head unit and accessible from the underside thereof; and movable latch means associated with the case for locking the head unit to and releasing it from the case, said latch means being adapted to be engaged with and disengaged from the said lug means in response to movement of said lever arm, said case halves having recesses together accommodating the said lever arm.

References Cited in the file of this patent

UNITED STATES PATENTS

| | | |
|---|---|---|
| 980,593 | Brunacci | Jan. 3, 1911 |
| 1,127,433 | Greist et al. | Feb. 9, 1915 |
| 2,306,172 | Lindholm | Dec. 22, 1942 |
| 2,325,267 | Murphy | July 27, 1943 |
| 2,559,772 | Kobler et al. | July 10, 1951 |